(12) United States Patent
Smith et al.

(10) Patent No.: US 9,883,629 B2
(45) Date of Patent: Feb. 6, 2018

(54) GROUND TREATMENT DEVICE (71) Applicant: Innovative Concepts, LLC, College Grove, TN (US)

(72) Inventors: Eden T. Smith, Murfreesboro, TN (US); Todd M. Smith, Pleasant View, TN (US)

(73) Assignee: Innovative Concepts, LLC, College Grove, TN (US)

( * ) Notice: Subject to any disclaimer, the term of this patent is extended or adjusted under 35 U.S.C. 154(b) by 26 days.

(21) Appl. No.: 14/738,045

(22) Filed: Jun. 12, 2015

(65) Prior Publication Data
US 2015/0359159 A1 Dec. 17, 2015

Related U.S. Application Data

(60) Provisional application No. 62/011,756, filed on Jun. 13, 2014.

(51) Int. Cl.
*A01D 43/12* (2006.01)
*A01B 45/02* (2006.01)

(52) U.S. Cl.
CPC ............ *A01D 43/12* (2013.01); *A01B 45/026* (2013.01)

(58) Field of Classification Search
CPC .... A01D 43/12; A01D 34/001; A01B 45/026; A01B 3/62; A01B 33/02; A01B 33/087; A01B 45/02; A01B 51/023; A01B 63/00; A01B 63/002; A01B 63/11; A01B 75/00; B62D 63/06; A01C 7/208
See application file for complete search history.

(56) References Cited

U.S. PATENT DOCUMENTS

| | | | | |
|---|---|---|---|---|
| 5,398,768 A * | 3/1995 | Staples | ................... | A01B 45/02 172/122 |
| 5,579,847 A * | 12/1996 | Postema | ................. | A01B 45/02 172/21 |
| 5,586,604 A * | 12/1996 | Postema | ................. | A01B 45/02 172/21 |
| 5,623,996 A * | 4/1997 | Postema | ................. | A01B 45/02 172/118 |
| 6,145,855 A * | 11/2000 | Bellis, Jr. | ............. | B62D 49/065 280/32.7 |
| 6,241,025 B1 * | 6/2001 | Myers | ..................... | A01B 35/28 172/21 |
| 6,457,903 B1 * | 10/2002 | Dufty | ..................... | A01B 29/06 172/118 |
| 6,460,624 B1 * | 10/2002 | Dufty | ..................... | A01B 45/02 172/21 |
| 6,497,422 B1 * | 12/2002 | Bellis, Jr. | ............. | B62D 49/065 280/32.7 |

(Continued)

*Primary Examiner* — Alicia Torres
*Assistant Examiner* — Adam J Behrens
(74) *Attorney, Agent, or Firm* — LaBatt, LLC (57) ABSTRACT

An apparatus for performing a ground treatment, such as aeration or dethatching, is provided. The apparatus includes a base frame component to which a pair of angled side frame components are pivotally mounted. Each angled side frame can include first and second ends that are oriented to form a central angle. A first end of an angled side frame can be pivotally attached to a wheel and/or the base frame component, while the second end can include a mechanism for mounting a ground treatment component.

20 Claims, 8 Drawing Sheets

(56) References Cited

U.S. PATENT DOCUMENTS

| | | | | |
|---|---|---|---|---|
| 6,637,760 B1* | 10/2003 | Carman | ............... | A01D 34/001 |
| | | | | 280/32.7 |
| 7,070,005 B2* | 7/2006 | Maas | ................... | A01B 45/026 |
| | | | | 172/22 |
| 7,300,061 B1* | 11/2007 | Omstead | ................ | A01D 67/00 |
| | | | | 280/32.7 |
| 7,743,840 B2* | 6/2010 | Hoffman | ............... | A01B 45/02 |
| | | | | 172/21 |
| 8,033,552 B1* | 10/2011 | Jacobs | ................... | B60D 1/145 |
| | | | | 180/15 |
| 8,459,371 B2* | 6/2013 | Hoffman | ............... | A01B 45/02 |
| | | | | 172/21 |
| 2003/0201106 A1* | 10/2003 | Jessen | ................... | A01B 45/02 |
| | | | | 172/21 |
| 2008/0196373 A1* | 8/2008 | Wilson | ................... | A01D 43/12 |
| | | | | 56/10.1 |
| 2009/0096178 A1* | 4/2009 | Beal | ..................... | A01D 34/001 |
| | | | | 280/32.7 |
| 2009/0236106 A1* | 9/2009 | Hoffman | ............... | A01B 45/02 |
| | | | | 172/21 |
| 2012/0211954 A1* | 8/2012 | Havener | .............. | A01D 34/001 |
| | | | | 280/32.7 |

* cited by examiner

GROUND TREATMENT DEVICE

REFERENCE TO RELATED APPLICATIONS

The current application claims the benefit of U.S. Provisional Application No. 62/011,756, which was filed on 13 Jun. 2014, and which is hereby incorporated by reference.

TECHNICAL FIELD

The disclosure relates generally to ground treatment, and more particularly, to a device for performing a ground treatment operation, such as aeration.

BACKGROUND ART

In lawn care, a sulky is an attachment that allows an operator of a lawnmower to ride behind the lawnmower. In general, the sulky is attached to a walk-behind lawnmower and the operator stands or sits on the sulky while operating the lawnmower. Sulkies are commonly used by landscapers, as they enable the landscaper to operate the lawnmower at full speed without tiring from walking/jogging.

Lawn aeration is a common landscaping operation. Some previous approaches have sought to combine an aerator with a sulky. One approach proposes that the operator stand on a first platform when aerating is not desired, and stand on a second platform when aerating. The weight of the operator on the sulky forces the tines into the soil. In another approach, the operator stands on a platform located behind a tine assembly.

SUMMARY OF THE INVENTION

Aspects of the invention provide a ground treatment device having one or more features described herein. In an illustrative embodiment, the ground treatment device comprises an aeration device, which is configured to be attached to a self-propelled machine, such as a walk-behind lawnmower. For example, aspects of the invention provide an apparatus for performing a ground treatment, such as aeration or dethatching. The apparatus includes a base frame component to which a pair of angled side frame components are pivotally mounted. Each angled side frame can include first and second ends that are oriented to form a central angle. A first end of an angled side frame can be pivotally attached to a wheel and/or the base frame component, while the second end can include a mechanism for mounting a ground treatment component.

A first aspect of the invention provides an apparatus comprising: a base frame component; a pair of wheels; and a pair of angled side frame components pivotally mounted to the base frame component, each angled side frame component including: a first end on which a wheel of the pair of wheels is pivotally connected; a central angle; and a second end, the second including means for removably mounting a ground treatment component.

A second aspect of the invention provides an apparatus comprising: a base frame component; a pair of wheels; a pair of angled side frame components, each angled side frame component including: a front arm and a back arm, wherein the front arm and the back arm are oriented to form an inverted angle; and a plate permanently attached to the front arm and the back arm forming the inverted angle, wherein the plate is pivotally mounted to the base frame component, wherein the back arm includes means for removably mounting a ground treatment component; and means for pivotally attaching the pair of wheels to at least one of: the base frame component or the pair of angled side frame components.

A third aspect of the invention provides an apparatus comprising: a base frame component including: a vertically oriented back plate; and a horizontally oriented platform extending from a bottom, central portion of the vertically oriented back plate; a pair of wheels; a pair of angled side frame components, each angled side frame component including: a front arm to which a wheel of the pair of wheels is pivotally connected; a back arm including means for removably mounting a ground treatment component, wherein the front arm and the back arm are oriented to form an inverted angle; and a plate permanently attached to the front arm and the back arm forming the inverted angle, wherein the plate is pivotally mounted to the vertically oriented back plate; and the ground treatment component mounted to the back arm of each angled side frame component of the pair of angled side frame components.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a ground treatment device having one or more features described herein. In an illustrative embodiment shown herein to illustrate unique aspects of the invention, the ground treatment device comprises an aeration device, which is configured to be attached to a self-propelled machine, such as a walk-behind lawnmower. For example, aspects of the invention provide an apparatus for performing a ground treatment, such as aeration or dethatching. The apparatus includes a base frame component to which a pair of angled side frame components are pivotally mounted. Each angled side frame can include first and second ends that are oriented to form a central angle. A first end of an angled side frame can be pivotally attached to a wheel and/or the base frame component, while the second end can include a mechanism for mounting a ground treatment component.

As used herein, unless otherwise noted, the term "set" means one or more (i.e., at least one) and the phrase "any solution" means any now known or later developed solution.

Figure 1:
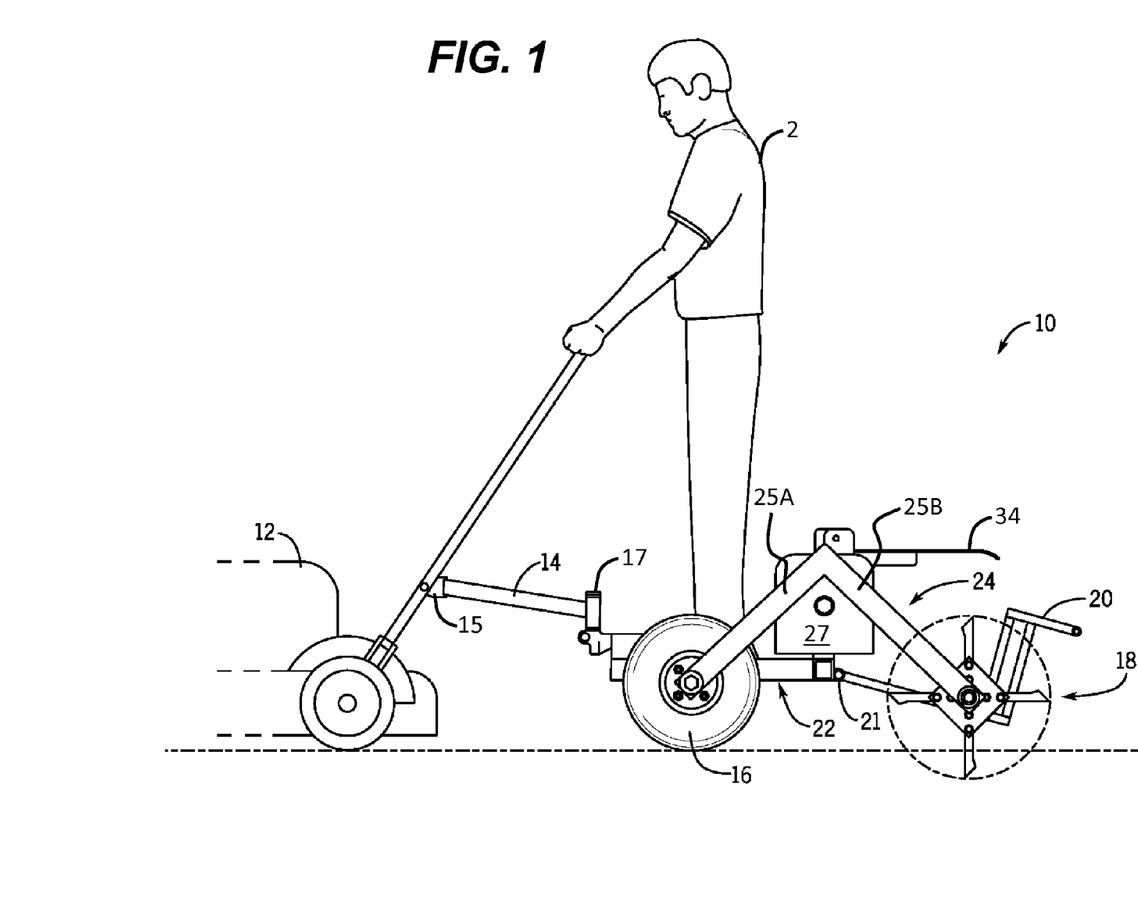
FIG. 1 shows a side elevation view of an illustrative aeration device in use in an aeration mode according to an embodiment.

Turning to the drawings, FIG. 1 shows a side elevation view of an aeration device 10 in use in an aeration mode according to an embodiment. As illustrated, the aeration device 10 can be attached to a self-propelled machine 12, which can be operated by a user 2 from a location at the rear of the machine 12. The machine 12 can comprise any type of self-propelled machine including an engine, wheels, and operating controls accessible to a user 2 located behind the machine. In an illustrative embodiment, the machine 12 comprises a walk-behind lawnmower, such as a commercial walk-behind lawnmower. However, it is understood that the machine 12 can comprise any type of machine having sufficient power to pull the aeration device 10 (or other ground treatment device) and operator 2 as described herein.

Figure 2:
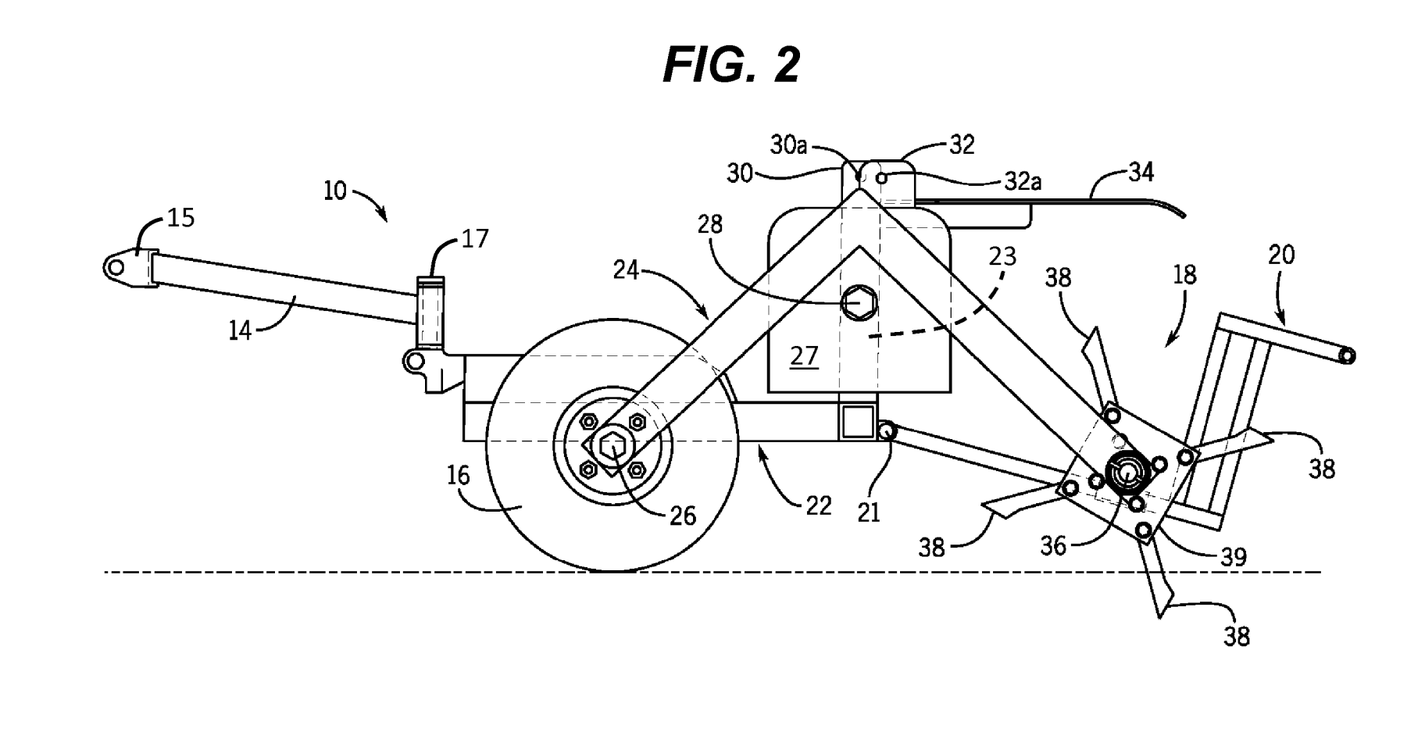
FIG. 2 shows another side elevation view of an illustrative aeration device according to an embodiment.
Figure 3:
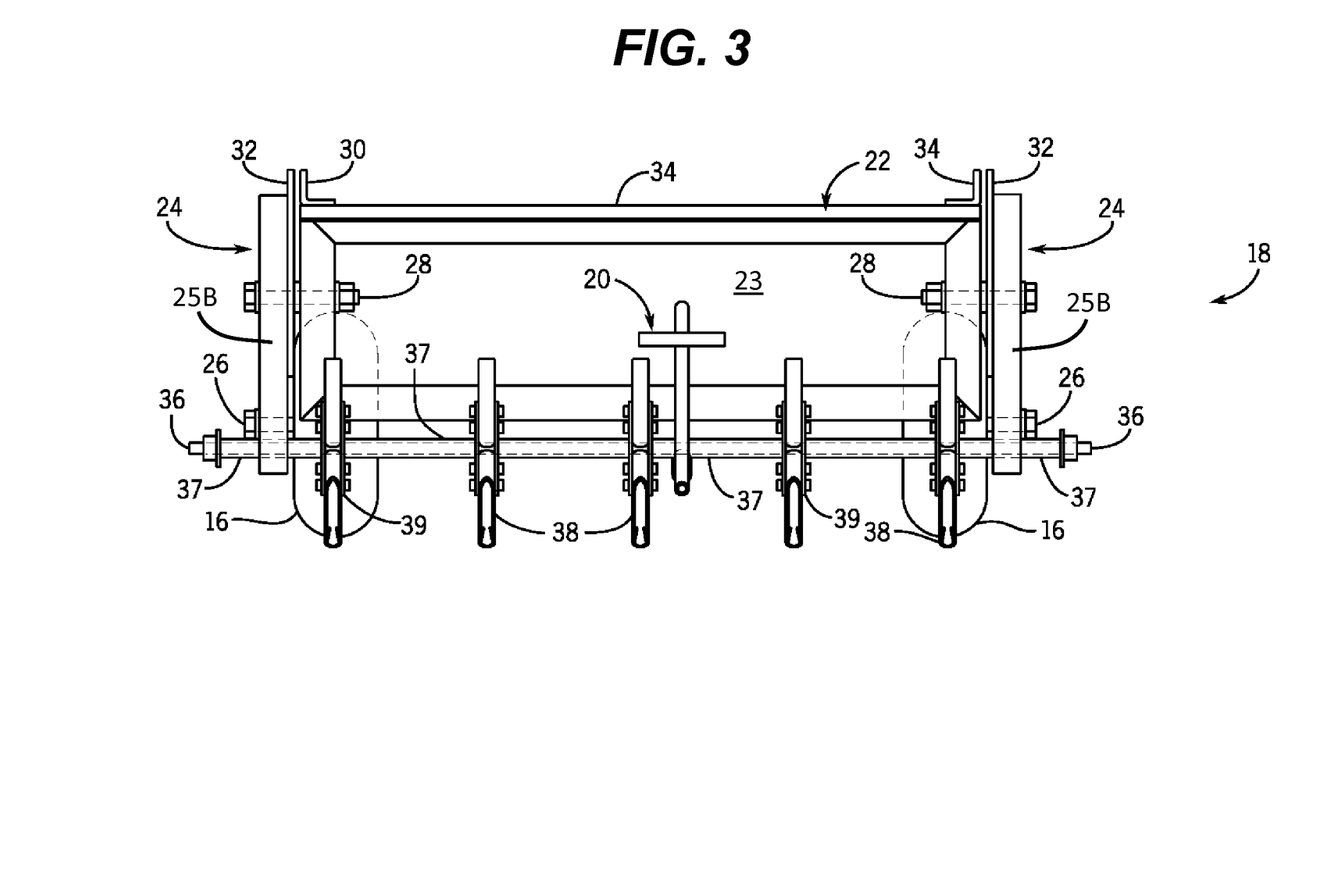
FIG. 3 shows a rear elevation view of an illustrative aeration device according to an embodiment.
Figure 4:
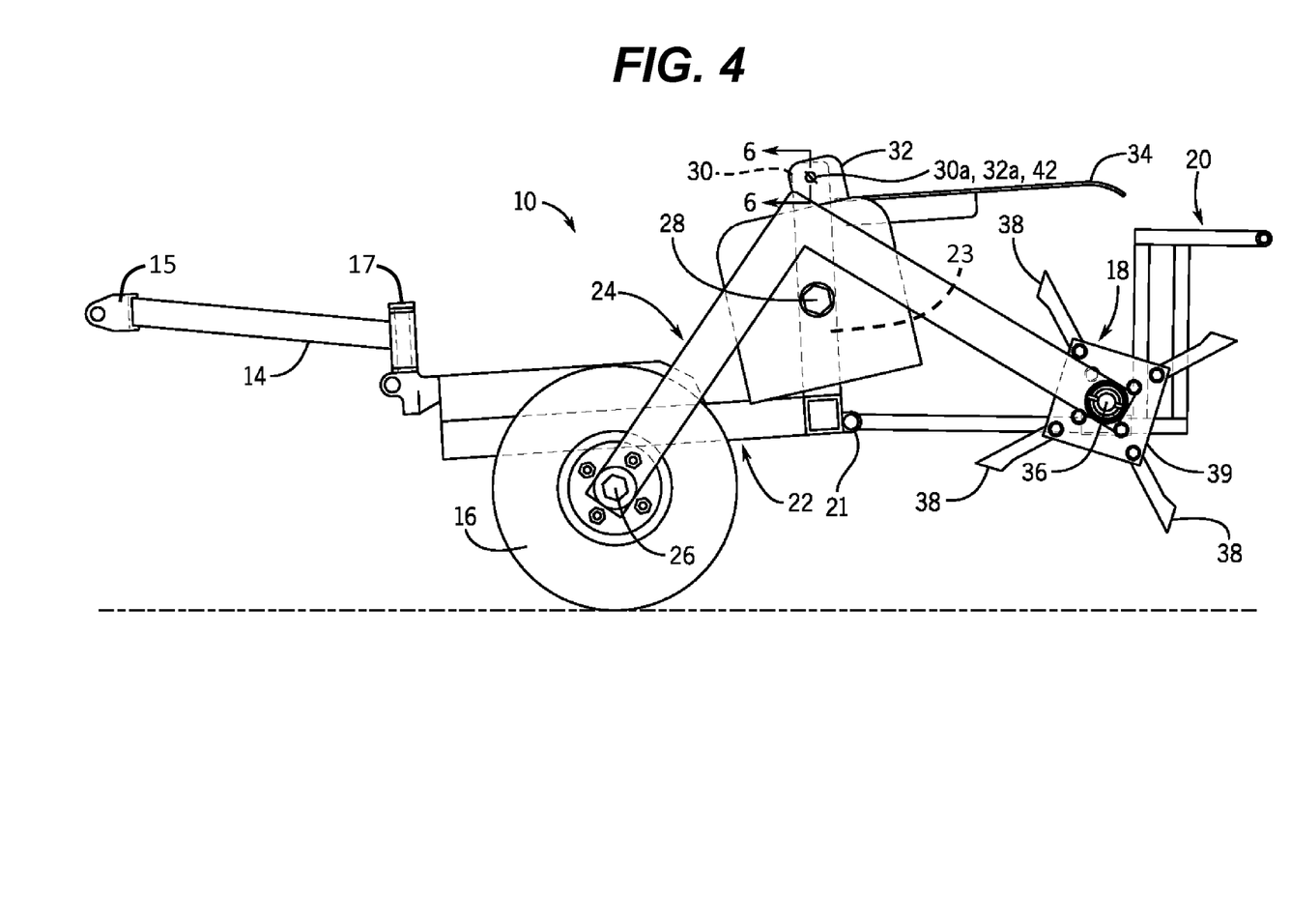
FIG. 4 shows a side elevation view of an illustrative aeration device in transportation mode according to an embodiment.
Figure 5:
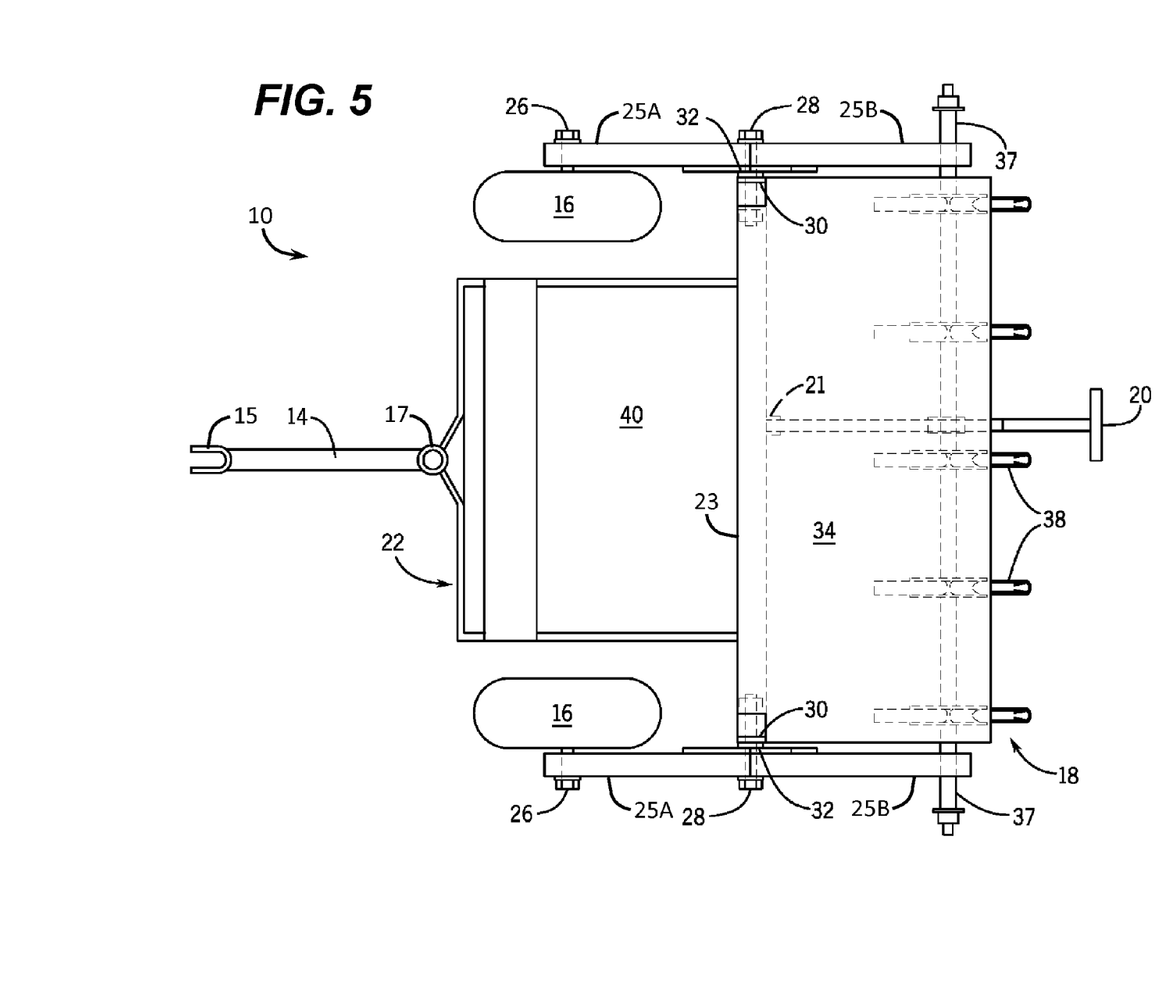
FIG. 5 shows a top plan view of an illustrative aeration device according to an embodiment.

Further illustrative aspects of a first embodiment of the invention are shown and described in conjunction with FIGS. 1-5. FIG. 2 shows another side elevation view of an aeration device 10 according to an embodiment; FIG. 3 shows a rear elevation view of an aeration device 10 according to an embodiment; FIG. 4 shows a side elevation view of an aeration device 10 in transportation mode according to an embodiment; and FIG. 5 shows a top plan view of an aeration device 10 according to an embodiment.

Referring generally to FIGS. 1-5, the aeration device 10 can be temporarily pivotally connected to the machine 12 via a pull bar 14. In an embodiment, a first end of the pull bar 14 is attached to the machine 12 using an attachment mechanism 15 that provides a fixed extension from the machine 12 (e.g., approximately 15-17 inches), and a second end of the pull bar 14 is attached to a base frame component 22 of the aeration device 10 using a pivotal attachment mechanism 17 (e.g., a clevis pin, or the like). The pivotal attachment mechanism 17 can be configured to provide any desired turn radius for the aeration device 10. In an embodiment, the turn radius is similar to that provided by standard sulkies configured for use behind commercial walk-behind lawnmowers. Furthermore, the pivotal attachment mechanism 17 can enable the aeration device 10 to maintain direction when the machine 12 is operated in both a forward and reverse direction.

The base frame component 22 includes a horizontally oriented platform 40 (e.g., having dimensions of approximately 16 inches by 24 inches) on which the user can stand while operating the machine 12 (and using the aeration device 10). Additionally, the base frame component 22 includes a vertically oriented back plate 23, which extends upward from the rear of the platform 40 (e.g., by approximately 7 inches). The vertically oriented back plate 23 can have a width (e.g., approximately 37 inches), with the platform 40 centrally located, to provide space on each side of the platform 40 to accommodate the wheels 16 as described herein. The base frame component 22 also can include a horizontally oriented safety cover 34, which can extend beyond a top of the vertically oriented back plate 23 over at least a portion of the aeration component 18 of the aeration device 10.

The aeration device 10 can travel along a pair of wheels 16. The wheels 16 can comprise any type of wheels 16 having any desired size. In an embodiment, the wheels 16 have a ten inch diameter. Each wheel 16 can be pivotally connected to a first end of a corresponding side frame component 24 using a pivotal connecting mechanism 26 (e.g., a 4" bolt and locknut). An aeration component 18 can be attached between the opposing ends of each of the side frame components 24 towards the rear of the aeration device 10. In this configuration, the wheels 16 and aeration component 18 are held in a free floating position, which can facilitate negotiation of the aeration device 10 over uneven terrain. Each side of the side frame component 24 can be pivotally attached to a corresponding side of the vertically oriented back plate of the base frame component 22 using a pivotal attachment mechanism 28 (e.g., a 4" bolt and locknut). In an embodiment, each side frame component 24 includes two arms 25A, 25B which are oriented with respect to one another to form a central angle, which can be in the shape of an inverted V, and includes a plate 27 permanently fixed (e.g., welded) to the two arms 25A, 25B at a location near the vertex of the central angle. In this case, the pivotal attachment mechanism 28 can extend through the plate 27 and into the base frame component 22 in a location substantially aligned with the vertex of the central angle formed by the two arms 25A, 25B. While the two arms 25A, 25B are shown connected, it is understood that the two arms 25A, 25B could remain apart and/or be connected by another piece with a different alignment than that of two arms 25A, 25B (e.g., a substantially horizontal arm).

The aeration component 18 can comprise a shaft 36, which extends through the side frame components 24 (e.g. the arm 25B of each side frame component 24) on one side of the central angle adjacent to one end of the side frame components 24. Furthermore, the aeration component 18 can include a set of plates 39, each of which includes a set of tines 38 (e.g., corers, spikes, and/or the like). In an embodiment, each tine 38 is attached to a plate 39 in a manner that allows the tine 38 to be removed and replaced with a different tine 39. Each plate 39 can be attached to the shaft 36 in a manner that causes the plate 39 and/or shaft 36 to rotate due to the motion of the aeration device 10 and forces resulting from the tines 38 entering and exiting the ground. For example, a plate 39 can comprise a free wheeling double sided aerator wheel including four tines 39. The plates 39 can be fabricated of steel and the shaft 36 can comprise a heavy duty steel axle to provide sufficient strength to endure side to side motion expected during commercial use, which may include: use in conjunction with a high speed machine 12, such as a commercial lawn mower; working on several properties; many hours of use; and/or the like. Furthermore, the aeration component 18 can include a set of spacers 37, which are configured to maintain any desired spacing between adjacent plates 39, a plate 39 and the side frame component 24, and/or the like. Regardless, the various tines 38 can be configured to rotate independently from one another, which can improve performance of the aeration component 18, e.g., when turning.

The aeration device 10 can include a mechanism to enable the aeration component 18 to be secured in an elevated position to facilitate, for example, transport of the aeration device 10. To this extent, the aeration device 10 is shown including an adjustment handle 20, which can be pivotally attached to a location on the base frame component 22 using any type of pivotal attachment mechanism 21 (e.g., opposing tabs and an adjustment handle 20 end inserted there between including holes which can be aligned with a bolt inserted there through, a pivot sleeve in or over which the handle can be inserted, and/or the like). The adjustment handle 20 can include a first portion that extends under the shaft 36 of the aeration component 18, and a second portion that extends upward to allow for easier operation by an individual. In an embodiment, the pivotal attachment mechanism 21 is configured to limit downward motion of the adjustment handle 20 such that the adjustment handle 20 remains suspended and does not drag along the ground during use of the aeration device 10. Furthermore, the adjustment handle 20 can be configured to be removed during use of the aeration device 10. In this case, the aeration device 10 can include a mechanism for securely storing the adjustment handle 20, e.g., on or below the safety cover 34 during use of the aeration device 10.

Figure 6:
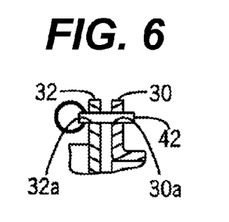
FIG. 6 shows a cross-sectional view taken on line 6-6 of FIG. 4 according to an embodiment.
Figure 7A:
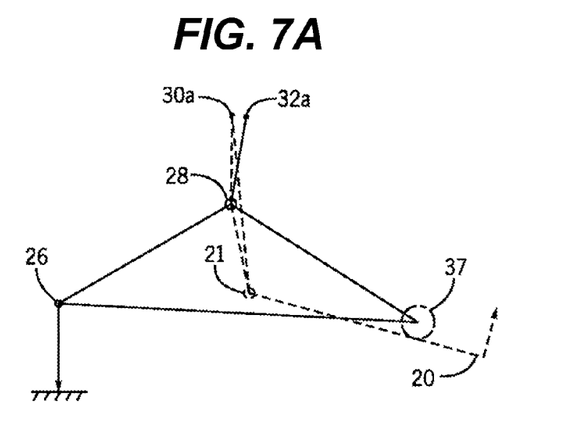
FIGS. 7A and 7B show schematic views of an aeration device in aeration and transportation modes, respectively, according to embodiments.
Figure 7B:
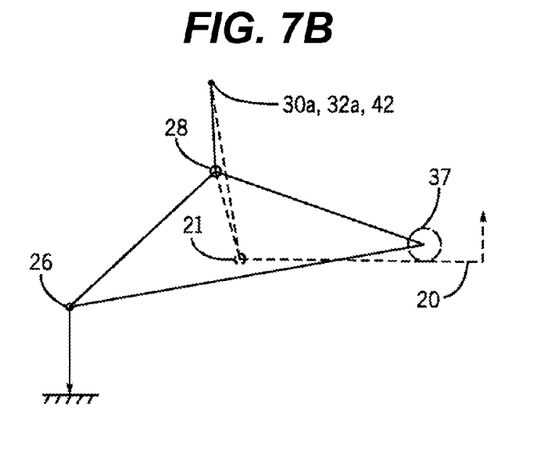

Regardless, to lift the aeration component 18, an individual can lift up on the adjustment handle 20, which will exert an upward force on the shaft 36 of the aeration component 18. The aeration component 18 can be secured in an elevated position using any solution. For example, as shown in FIGS. 4 and 6, the base frame component 22 can include a tab 30 with a hole 30a there through and the side frame component 24 can include a similarly configured tab 32 with a hole 32a there through. FIGS. 7A and 7B show schematic views of the aeration device 10 in aeration and transportation modes, respectively, according to embodiments. The tabs 30, 32 and corresponding holes 30a, 32a can be located such that the upward force on the shaft 36 causes the holes 30a, 32a located on the tabs 30, 32 of the base frame component 22 and side frame component 24, respectively, to align. The individual can insert a pin 42 through the aligned holes to keep the aeration component 18 elevated. A user can continue to stand on the platform 40 and operate the machine 12 while the aeration component 18 is in transport mode.

To configure the aeration device 10 for use, the individual can lift up on the adjustment handle 20 to relieve pressure on the pin(s) 42, remove the pin(s) 42, and lower the adjustment handle 20, thereby allowing the aeration component 18 to lower. In an embodiment, each side of the base frame component 22 and side frame component 24 includes tabs 30, 32 with holes 30a, 32a. Alternatively, only a single side can include the tabs 30, 32. Furthermore, the tabs 30, 32 can be located in a different location. For example, the safety cover 34 and handle 20 can include the tabs 30, 32 or a similar mechanism. Regardless, it is understood that the use of tabs 30, 32 and pin(s) 42 to secure the aeration component 18 in an elevated position is only illustrative of various mechanisms, which can be utilized.

In an embodiment, during operation of the aeration device 10 in an aeration mode, each side frame component 24 can act as an equalizer bar, which brings the weight of the operator 2 down to the wheels 15 in the front and the aeration component 18 in the back in such a way as to cause the tines 38 to remain in contact with the ground. Additionally, a combination of the base frame component 22 and side frame components 24 provide a rigid platform in which the operator 2 will be able to travel over uneven ground while safely maintaining control of the machine 12.

The various components described herein can be constructed of any type of material capable of providing sufficient strength and durability for a number of repeated uses of the aeration device 10. For example, the base frame component 22 can comprise a steel reinforced platform having a thickness of approximately ⅛", and the side frame components 24 can be constructed of square steel tubing having a diameter of approximately 1.5 inches, or a thinner steel having a comparable strength. The pull bar 14 can be formed of 1½" square steel tubing.

It is understood that the various dimensions described herein are only illustrative and any combination of the dimensions can be changed to provide a desired feature. For example, in an embodiment, an overall width of the aeration device 10 can be approximately thirty-six inches or less. In this case, the widths of the horizontal platform 40, the vertically oriented back plate 23, the safety cover 34, and the shaft 36 of the aeration component 18 can be made shorter (e.g., by approximately three inches) than that of the embodiment described above. Similarly, a number of and/or spacing between the tines 39 can be adjusted to accommodate a smaller or larger width. However, it is understood that these widths are only illustrative, and a ground treatment device 10 described herein can have any width.

While shown and described herein as an aeration device 10, it is understood that aspects of the invention further provide various alternative embodiments. For example, in one embodiment, the invention provides a device configured to perform one or more alternative ground treatment operations. Such a device can include an alternative ground treatment component and/or be re-configured by removing and inserting any one of a plurality of different ground treatment components. For example, instead of an aerating component 18, an embodiment of the device can include a grass cutting component, a seed planting component, a fertilizing component, a harvesting component, a mulching component, a bagging component, a dethatching component, and/or the like. In each case, the corresponding component can be designed using any solution. Furthermore, one or more aspects of the aerating component 18 (e.g., dimensions) shown and described herein can be modified to accommodate the alternative component using any solution.

Figure 8:
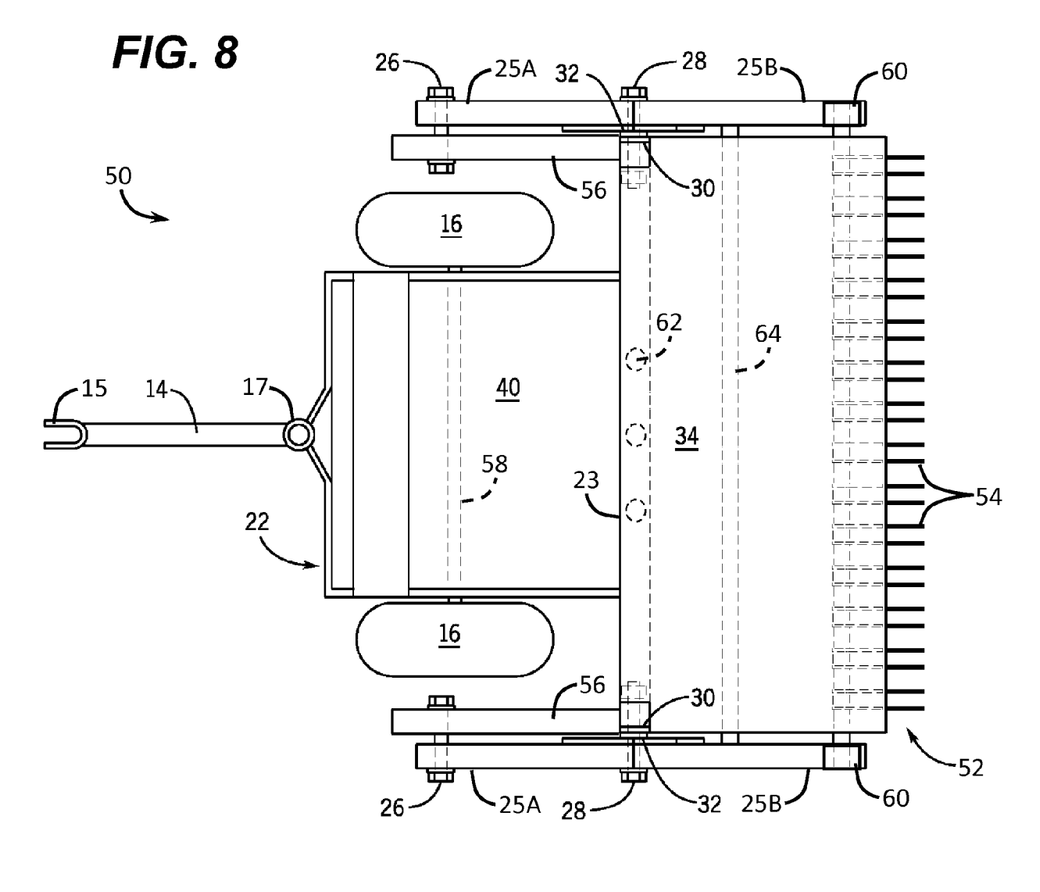
FIG. 8 shows a top plan view of an illustrative dethatching device according to an embodiment.

To this extent, FIG. 8 shows a top plan view of an illustrative dethatching device 50 according to an embodiment. In FIG. 8, similar numbering is used to refer to components of the dethatching device 50 which are similarly configured as the corresponding components shown and described in conjunction with the aeration device 10 (FIGS. 1-6). However, in this case, the dethatching device 50 includes a dethatching component 52 attached to the side frame components 24. The dethatching component 52 can include a plurality of tines 54, which are configured to scrape a top surface of the ground when in use to remove thatch built up thereon and/or scarify the soil.

In this embodiment, the base frame component 22 includes a pair of side extensions 56, which extend from the vertically oriented back plate 23. The side frame components 24 are pivotally attached to an end of each of the side extensions 56 using a pivotal connecting mechanism 26. Each side extension 56 can comprise, for example, square steel tubing having a diameter of approximately 1.5 inches, or a thinner steel having a comparable strength, which is permanently attached (e.g., welded) to the vertically oriented back plate 23. Additionally, the wheels 16 are shown secured to the horizontally oriented platform 40 of the base frame component 22 using any solution, e.g., via an axle 58, a pair of pivotal connecting mechanisms, and/or the like. In this case, the platform 40 and wheels 16 can be detached from the remainder of the dethatching device 50 and used apart from a ground treatment component, such as the dethatching component 52, as a standalone sulky. For example, the platform 40 can be connected to the vertically oriented back plate using a series of connector bolts 62 or the like. Furthermore, the dethatching component 52 can be removed for repair, swapped out for attachment of another ground treatment component (such as the aerating component 18) to the base frame component 22, and/or the like.

A ground treatment device described herein can include various other features and/or alternative configurations. For example, the dethatching component 50 is shown including a stabilizer 64, which can be attached to each side frame component 24, e.g., the arm 25B of each side frame component 24 to stiffen the dethatching device 50 for side to side forces. The stabilizer 64 can comprise, for example, a one inch square steel tubing, or a thinner steel having a comparable strength, which can be temporarily (e.g., using one or more bolts and locknuts) or permanently (e.g., welded) attached to the interior sides of the arms 25B of each side frame component 24. The stabilizer 64 can be placed so as not to interfere with the operation of any ground treatment component, which can be attached to the side frame components 24 as discussed herein. Inclusion of the stabilizer 64 can enable a user to more readily lift the side frame components 24, e.g., to secure the dethatching component 52 in an elevated position as described herein (e.g., without the need for an adjustment handle 20). To this extent, each side frame component 24 can further include a mechanism for indicating or otherwise facilitating the user's ability to grip the arm(s) 25B to lift the dethatching component 52. For example, a handle can be removably attached to an arm 25B and/or the stabilizer 64.

Figure 9:
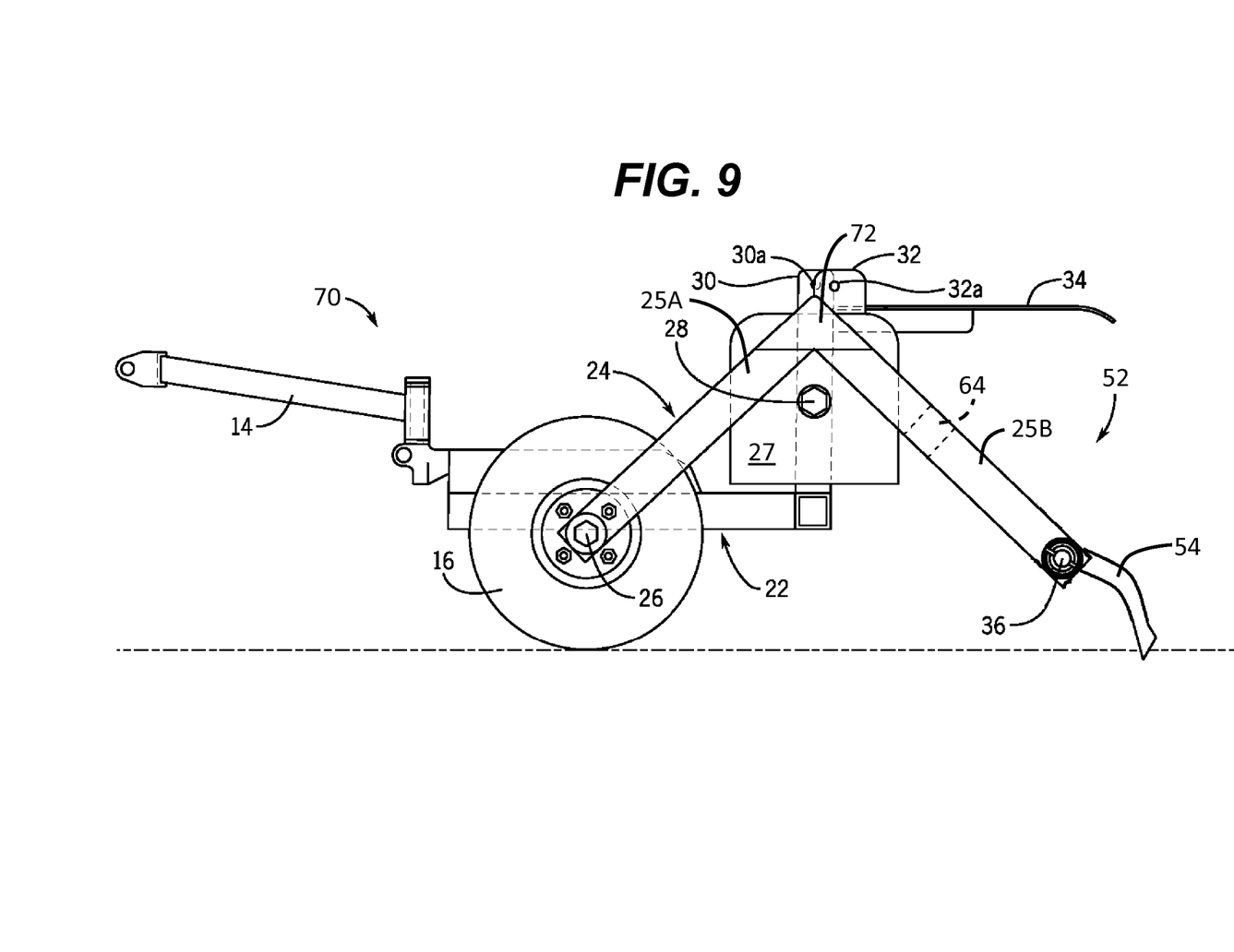
FIG. 9 shows a side elevation view of an illustrative dethatching device according to an embodiment.

FIG. 9 shows a side elevation view of an illustrative dethatching device 70 according to another embodiment. In FIG. 9, similar numbering is used to refer to components of the dethatching device 70 which are similarly configured as the corresponding components shown and described in conjunction with the aeration device 10 (FIGS. 1-6) and/or the dethatching device 50 (FIG. 8). The dethatching device 70 is shown including a triangular metal bracket 72 (e.g., a gusset), which can be permanently attached to the plate 27 (e.g., welded) at a location where the arms 25A, 25B intersect, e.g., to provide increased support at the intersection. Additionally, in an embodiment, the plate 27 itself can be a triangular metal bracket, which is sized to allow for attachment of the plate 27 to the base frame component 22 using the pivotal attachment mechanism 28. It is understood that the embodiments shown and described herein are only illustrative and numerous variations are possible. To this extent, an embodiment can include any combination of the features shown and described in conjunction with only one of the embodiments.

In an illustrative embodiment, the wheels 16 can be configured to be selectively attached to the side frame components 24 as shown and described in FIGS. 1-5, to the platform 40 as shown and described in conjunction with FIG. 8 (e.g., when the side frame components 24 have been removed), and/or to the side extensions 56, e.g., in a similar manner as the wheels 16 are mounted to the side frame components 24. Furthermore, an embodiment can include wheels pivotally attached to or adjacent to the ends of the side frame components 24 to which a ground treatment component can be attached. For example, such wheels can be pivotally attached to the shaft 36 of the ground treatment component, to the arm 25B using a pivotal connecting mechanism (e.g., a 4" bolt and locknut), and/or the like. Such wheels may be desirable for various types of ground treatment components and/or be included as part of a ground treatment component and can be any suitable type and size, such as the same size or smaller than the wheels 16, or bigger than the wheels 16.

In another embodiment, the invention provides a method of treating ground using a ground treatment device having one or more features described herein. For example, the method can include attaching the aeration device 10 or the dethatching device 50 to a self-propelled machine 12 and operating the self-propelled machine 12 while standing on the platform 40 to treat the ground, e.g., to aerate or dethatch some or all of a lawn. Furthermore, when the self-propelled machine 12 comprises a lawnmower, the method can include concurrently mowing the lawn and performing a second ground treatment operation, such as aerating or dethatching, on the lawn.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:
1. An apparatus comprising:
   a base frame component including:
      a vertically oriented back plate; and
      a horizontally oriented platform extending forward from a bottom, central portion of the vertically oriented back plate;
   a pair of wheels; and
   a pair of angled side frame components pivotally mounted to opposing sides of the base frame component at locations aligned with a vertical plane including opposing ends of the vertically oriented back plate, each angled side frame component including:
      a first end on which a wheel of the pair of wheels is pivotally connected, wherein the vertically oriented back plate has a width greater than a width of the horizontally oriented platform to accommodate the pair of wheels located between each side of the horizontally oriented platform and the first end of a corresponding angled side frame component;
      a second end, the second end including means for removably mounting a ground treatment component behind the vertically oriented back plate; and
      a fixed inverted angle defined by the first end, the second end, and the location of the base frame component at which the angled side frame component is pivotally mounted.

2. The apparatus of claim 1, wherein a user of the apparatus stands on the horizontally oriented platform while utilizing the apparatus.

3. The apparatus of claim 1, the base frame component further including a horizontally oriented safety cover extending from a top of the vertically oriented back plate in a direction opposite the horizontally oriented platform, wherein the horizontally oriented safety cover is configured to extend over at least a portion of the ground treatment component.

4. The apparatus of claim 1, wherein each side frame component includes:
   a front arm and a back arm, wherein the front arm and the back arm are oriented to form the fixed inverted angle; and
   a central region attaching the front arm and the back arm and forming the fixed inverted angle.

5. The apparatus of claim 4, wherein the central region is pivotally mounted to the base frame component at a location vertically aligned with a vertex of a central angle formed by the front arm and the back arm.

6. The apparatus of claim 1, further comprising means for securing the ground treatment component in an elevated position.

7. The apparatus of claim 6, wherein the means for securing include:
a lifting mechanism for rotating the pair of angled side frame components with respect to the base frame component; and
a securing mechanism for maintaining an alignment of the pair of angled side frame components with respect to the base frame component such that the ground treatment component is elevated.

8. The apparatus of claim 7, wherein the lifting mechanism comprises a handle pivotally attached to the base frame component and extending below a portion of the ground treatment component.

9. The apparatus of claim 1, further comprising means for pivotally connecting the base frame component to a machine.

10. The apparatus of claim 9, wherein the means for pivotally connecting includes a pull bar extending from a front of the base frame component, wherein the pull bar is capable of horizontally rotating with respect to the base frame component.

11. An apparatus comprising:
a base frame component including a horizontally oriented platform on which a user of the apparatus stands while utilizing the apparatus;
a pair of wheels;
a pair of angled side frame components mounted to opposing ends of the base frame component, each angled side frame component including:
a front arm and a back arm, wherein the front arm and the back arm are oriented to form a fixed inverted angle; and
a central region permanently attached to the front arm and the back arm forming the fixed inverted angle, wherein the central region is pivotally mounted to the base frame component at a location behind the horizontally oriented platform, wherein the back arm includes means for removably mounting a ground treatment component behind the horizontally oriented platform and the central region; and
means for pivotally attaching the pair of wheels to at least one of: the base frame component or the front arms of the pair of angled side frame components, wherein the pair of wheels are located adjacent to the horizontally oriented platform and support the base frame component during transport of the apparatus and use of the ground treatment component.

12. The apparatus of claim 11, wherein the base frame component further includes a vertically oriented back plate, wherein the horizontally oriented platform is removably connected to a bottom, central portion of the vertically oriented back plate, wherein each angled side frame component of the pair of angled side frame components is rotatably mounted to the base frame component at locations aligned with a plane including opposing ends of the vertically oriented back plate.

13. The apparatus of claim 12, the base frame component further including a horizontally oriented safety cover extending from a top of the vertically oriented back plate in a direction opposite the horizontally oriented platform, wherein the horizontally oriented safety cover is configured to extend over at least a portion of the ground treatment component.

14. The apparatus of claim 11, further comprising the ground treatment component mounted to the pair of angled side frame components.

15. The apparatus of claim 14, wherein the ground treatment component is an aerating component.

16. The apparatus of claim 14, wherein the ground treatment component is a dethatching component.

17. The apparatus of claim 11, wherein the base frame component includes a horizontally oriented platform removably attached to a remainder of the base frame component, and wherein the horizontally oriented platform includes:
means for pivotally connecting the horizontally oriented platform to a machine; and
means for pivotally attaching the pair of wheels to the horizontally oriented platform.

18. An apparatus comprising:
a base frame component including:
a vertically oriented back plate; and
a horizontally oriented platform extending from a bottom, central portion of the vertically oriented back plate;
a pair of wheels;
a pair of angled side frame components mounted to opposing ends of the base frame component, each angled side frame component including:
a front arm to which a wheel of the pair of wheels is pivotally connected, wherein the pair of wheels are located adjacent to the horizontally oriented platform;
a back arm including means for removably mounting a ground treatment component, wherein the front arm and the back arm are oriented to form a fixed inverted angle; and
a central region permanently attached to attaching the front arm and to the back arm and forming the fixed inverted angle, wherein the central region is pivotally mounted to the base frame component at a location aligned with a vertical plane including opposing ends of the vertically oriented back plate; and
the ground treatment component mounted to the back arm of each angled side frame component of the pair of angled side frame components, wherein a weight applied to the horizontally oriented platform during use of the ground treatment component is transferred to the pair of wheels and the ground treatment component.

19. The apparatus of claim 18, further comprising:
a machine; and
means for pivotally attaching the base frame component to the machine.

20. The apparatus of claim 19, wherein the machine is a walk-behind lawnmower, and wherein the ground treatment component is one of: an aerating component or a dethatching component.

* * * * *

UNITED STATES PATENT AND TRADEMARK OFFICE
CERTIFICATE OF CORRECTION

| | | |
|---|---|---|
| PATENT NO. | : 9,883,629 B2 | Page 1 of 1 |
| APPLICATION NO. | : 14/738045 | |
| DATED | : February 6, 2018 | |
| INVENTOR(S) | : Eden T. Smith and Todd M. Smith | |

It is certified that error appears in the above-identified patent and that said Letters Patent is hereby corrected as shown below:

In the Claims

Column 10, Line 40, the text:
--a central region permanently attached to attaching the--
Should read:
--a central region permanently attaching the--.

Signed and Sealed this
Tenth Day of April, 2018

Andrei Iancu
*Director of the United States Patent and Trademark Office*